May 20, 1958  R. GALINSKI  2,835,123
WASHING APPARATUS WITH LIQUID SEAL FOR ROTATING SHAFT
Filed June 28, 1954
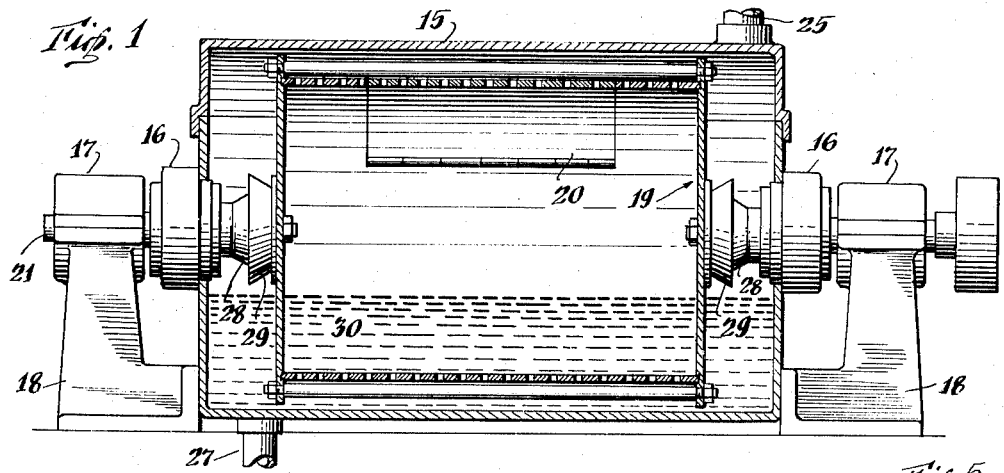
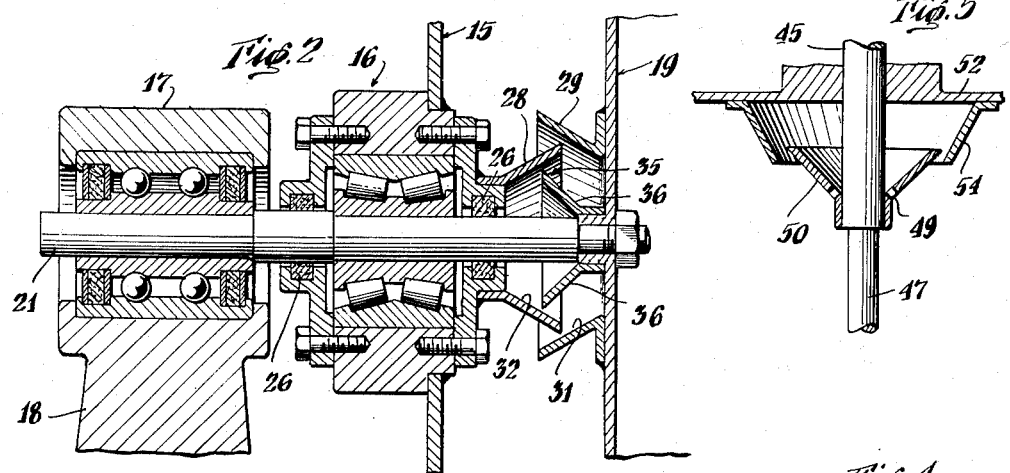
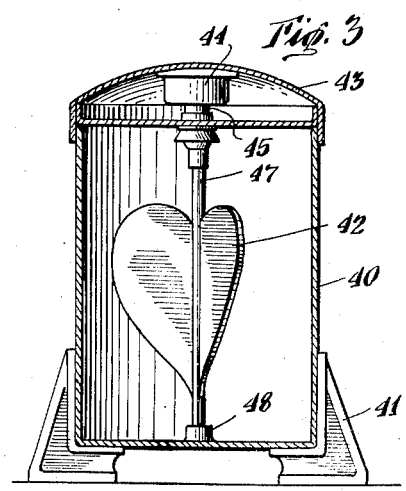
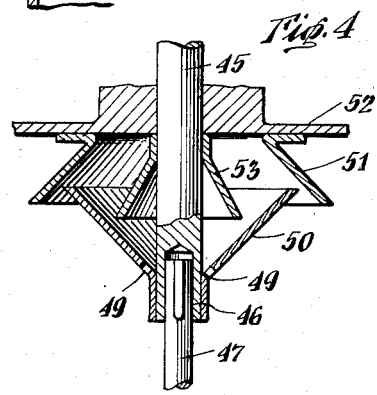
INVENTOR
Roman Galinski
BY
Emery Varney Whittemore & Dix
ATTORNEYS

United States Patent Office 2,835,123
Patented May 20, 1958

2,835,123
WASHING APPARATUS WITH LIQUID SEAL FOR ROTATING SHAFT

Roman Galinski, New Britain, Conn.

Application June 28, 1954, Serial No. 439,513

1 Claim. (Cl. 68—140)

This invention relates to an improved apparatus that prevents liquids from "crawling" or "creeping" along a shaft while it is rotating or while it is standing still.

This invention also relates to an improved type of apparatus for sealing off a bearing from a liquid that is splashed over it or crawls along a rotating shaft and which shaft is supported by the bearing.

This invention further pertains to an improved liquid sealing apparatus cooperating with a shaft that rotates near a splashing liquid where the liquid would normally "crawl" or "creep" along the shaft during operation, or when the shaft is not rotating.

This invention has particularly to do with an improved construction of apparatus that prevents liquid from passing a predetermined point on a shaft which rotates near a liquid or a material that ordinarily tends to seep into a bearing near such a shaft. Such an improved apparatus protects a bearing that supports the shaft from corrosion, dilution, loss or contamination of lubricant, and subsequent rapid wear or failure.

It is a desire to provide an improved apparatus that prevents a liquid from reaching a bearing that supports a rotating shaft and to have the improved apparatus accomplish its function without being in physical contact or have frictional and wear relation with the shaft.

A feature of this invention is the construction of an improved apparatus for sealing off a bearing and its housing from splashing or seeping of a liquid.

It is a feature of this invention to provide a liquid seal on a rotary shaft that effectively prevents the liquid from passing a certain place on the shaft while still not being in frictional engagement with the shaft.

Another feature of this invention is the provision of an improved shield type of seal that prevents liquid creepage along a shaft whether the shaft is rotating or still.

Still another feature of the invention is the installation of a liquid seal of several parts that cooperate to prevent a liquid from passing or creeping along a shaft to a point where it is not desired.

Another feature of the invention is to provide an improved liquid seal that has several parts assembled in unengaging relation but cooperating to throw any liquid away from the shaft so that it will not reach a bearing which the seal protects and which supports the shaft.

The foregoing and other objects, features and advantages will be appreciated by reading the following detailed description taken with the drawings, wherein—

Fig. 1 is a general overall view of the improved apparatus as assembled in a laundry machine, shown partly in section;

Fig. 2 is an enlarged view in section of one of the bearings in the apparatus shown in Fig. 1;

Fig. 3 is a view, partly in section, of a small washing machine showing the improved seal in a vertical type of washing machine;

Fig. 4 is an enlarged view in section of the bearing as installed in the machine shown in Fig. 3; and Fig. 5 is a modified form of the improved shield as applied to the vertical type of washing machine.

The improved seal herein is particularly advantageous in constructions of washing machines, liquid tumbler type of machines, tanks, etc., where there is a rotating inner cylinder mounted on a shaft and partly contained in a liquid, and which during its operation, splashes the liquid. The improved type of seal herein prevents the liquid from reaching the shaft bearings and housing. Heretofore to prevent leakage or creepage of liquid along a shaft into a bearing, there have been employed and assembled on a shaft various kinds of gland packings, stuffing boxes, rubber seals, and the like, all of which only give temporary protection, and each of those depends upon the physical contact of the packing, stuffing, etc., with the shaft. Such packing wears more or less quickly, depending upon the materials employed and whether some particular conditions (heat, speed, corrosive action) create excessive wear or constant need of adjustment in order to prevent liquid from reaching the bearings. Such types of packing material, as leather, rubber, asbestos, etc., and the other materials noted above, practically always have to be in proper alignment and concentricity, and must be manufactured and assembled with fairly close tolerances. If the packings are too tight, there is an overheating and deterioration and the wearing takes place rapidly. If the packings are too close, then the purpose of the packing is not accomplished.

Therefore, the advantages of this novel type of seal will be particularly appreciated in referring to the drawings.

In the improved sealing apparatus herein, splashing or creeping liquid is prevented from reaching the bearing or housing by a seal made up of minimum parts which are assembled, not in physical contact, but which cooperate with each other to prevent any splashing or creeping of liquid from reaching the bearing or housing.

Referring now to the drawings, fairly well known laundry apparatus is shown consisting of an outside liquid container 15 holding suitable roller bearings 16 that in turn cooperate with stationary bearings 17 to hold a shaft 21. The bearings 17 are held on supports 18. Within the outside container 15 there is a tumbling drum or clothes container 19 provided with a filling door 20. This container 19 is of the rotatable type and it is supported on the shafts 21, which in this preferred drawing, end at their points of engaging the rotating container 19, as particularly shown in Fig. 1. However, this shaft 21 may be extended through the clothes rotating container 19, when desired.

In this type of laundry machine or apparatus, it is usual to flow the liquid into outside container 15 through pipe 25 to a desired level. An outlet pipe 27 is provided with a valve, not shown, for draining the outside container 15 after the laundering has been completed.

In the operation of this particular type of laundry machine, there will be a great deal of splashing of the liquid or water or cleaning fluid. It is desired to especially protect the bearings 16 from the water or cleaning fluid, splashed up, or from liquid which might creep along the shaft 21 during rotating time of the shaft or during rest period. In the usual type of bearing, an oil seal 26 is included as noted in the drawing, but this is not a necessary requirement but is included when desired.

In providing an improved sealing apparatus to prevent liquid from reaching the bearings 16, advantage is taken of centrifugal action of the shaft 21, and the following description herein of the preferred form will be particularly made in reference to the showing in Fig. 2.

The apparatus for protecting the bearing 16 is shown in its preferred form in this Fig. 2 and preferably comprises a series of elements mounted, partly on or adjacent the shaft and partly on the bearing or its housing, and in a manner that does not allow the parts to physically engage each other but which parts cooperate in their operations and functioning to prevent any splashed or creeping liquid from reaching the bearing 16.

In this preferred form of seal, it preferably consists of two or more collars that are constructed in any suitable manner and contour and are mounted in suitable fashion to throw or drain liquid away from the bearing, while they are still not being in definite physical engagement with each other. In accomplishing this purpose and function, it is preferred that one collar be fastened to the non-rotating support or portion of the bearing, and another collar be supported by the shaft, or by the clothes container 19 and be held in relation to each other so that during rotation or rest periods of the shaft the liquid flowing or dripping from one collar to the other will require the liquid to be thrown or dripped away from the bearing itself. In this preferred construction, the non-rotating part of the seal is desired to be constructed in the form of a truncated cone 28, and a second truncated cone 29 carried by the clothes container 19 and rotatable therewith, is positioned to have its open end a little larger in diameter than the cone 28 and to have the open end of cone 28 positioned within a portion of the cone 29. If desired, cone 29 may be extended so that it may engage the shaft 21, but in any event, it is rotated by the shaft 21 or by the shaft through a portion of the clothes container 19 as particularly noted in Fig. 2.

It will be noted that any liquid that is splashed during the rotation of the clothes container 19 will be thrown from the free edge of truncated cone 29 back to the liquid 30 in the container 15. Experience has shown that the splashing will cause the liquid to reach and engage the inside surface 31 of cone 29, and will in some events be splashed to the inside surface 32 of cone 28. Any liquid that enters the inside of cone 28 will, by gravity, drop down to the inside surface 31 of cone 29, and be thrown away from the cone by centrifugal force during the rotation of the shaft 21. When the clothes rotating container 19 is at rest, then any liquid that is on the inner surfaces 31 and 32 will drop down into the liquid 30 and will not reach the bearing 16. Thus, it will be seen that there is provided an improved seal that does not physically and frictionally engage the shaft 21 but does effectively prevent liquid from reaching the bearing 16 and the housing 17.

While the truncated cones 28 and 29 shown in Fig. 2 are of material thickness, it will be understood that they may be of any type of material and of desired thickness or thinness. The cones may be of thin metal of cup or dished-shaped so that they function as a seal-shield to prevent liquid from reaching the bearings. Also, this seal-shield, or the equivalent parts therefor, act during rotation of the shaft or during its rest periods to prevent a liquid from passing a particular point on the shaft because the liquid will be thrown off or drained off.

It is desired that the outer cone or shield be of the truncated cone type, and that the shield portion 28 mounted on the bearing support itself can be of any type of structure that has at least one portion thereof which would cause liquid to drop or drain to the inner surface 31 of the cone collar 29. It is desired, however, that both shields or collars 28 and 29 be of the truncated cone type and be positioned relative to each other as shown in Fig. 2.

As a help and of assistance, and often times not necessary but advisable, to increase efficiency, there is provided another or third truncated cone 35 supported from the shaft 21 and positioned to have its larger diameter within the outer edge of cone 28 so that in the event any particular amount of liquid reaches spaced within the inner surface 31 of cone 29, it will flow across the outer surface 36 of cone 35 and off from its edge onto the inner surface 32 of cone 28 and from there will flow outwardly and off from it onto inner surface 31 of cone 29 and from there back to the liquid 30. Thus, there is provided an efficient form of shield made of several parts which are mounted to prevent liquid from eaching the critical right hand portion of shaft 21 and the bearing 16, and to accomplish this result without the various parts of the shield having actual contacts with each other or relative rotational contact with the shaft 21

Referring now to Figs. 3, 4 and 5, another type of washing machine is shown. It is shown as the portable type. It comprises a clothes holder or container 40, preferably cylindrical, mounted on supports 41 and provided with a paddle type of rotor 42 which may oscillate or rotate. The top of container 40 receives a cover 43 which carries a motor 44. A driving shaft 45 extends from the motor to a joint 46 for engaging shaft 47 which carries the rotor 42. The lower end of shaft 47 is received in a bearing 48.

It is desired in this type of portable washer to prevent splashed liquid from moving up the shaft 47 through joint 45 to shaft 45, and in accomplishing this result an equivalent type of shield to that shown in Fig. 2 is employed. There is one difference, however, and that is that openings 49 are provided in the base of shield 50 mounted on the lower end of shaft 45. These openings 49 permit any liquid caught in shield 50 to flow out back to the liquid supply. In this portable type of washing machine, which usually operates with the shaft vertical instead of horizontal, the other parts of the seal are formed by truncated collar 51 which is fastened to the plate 52 that in turn is fastened to the cover 43 and carried thereby but does not rotate with the shaft 45. Again, as a matter of efficiency, another collar 53 is provided and preferably mounted on the shaft 45 and rotates therewith, thus forcing any liquid that might splash up against the underside of collar 53 to be thrown by centrifugal force to collar 50 and from there to collar 51 or to drain through openings 49. Thus, there is no likelihood of the liquid from this portable washing machine to pass along shaft 45 and reach the bearing near the motor 44.

Referring now to Fig. 5, it will be noted that the shield 50 with its openings 49 is mounted on the shaft 45, the same as in Fig. 4. However, an upper shield 54 carried by plate 52 is of different construction and points in the opposite direction to shield 51 of Fig. 4. The sealing is accomplished in substantially the same manner as the improved shield of this invention. The shield 50 may be positioned on shaft 45 at any desirable place so long as the larger diameter of the truncated cone is within the bottom edges of shield 54. If desired, a small shield 53 can also be mounted on shaft 45 in a manner indicated in Fig. 4.

It will be seen from the foregoing several descriptions that there is provided an improved seal to prevent liquid from reaching or being forced or from creeping to a bearing provided for a rotating shaft. It will also be seen that the seal is made up of several parts which do not actually physically engage each other but which do cooperate to provide a definite prevention of liquid reaching a bearing for a shaft which passes through the bearing. It will be further noted that the seal and the collars making up the same may be constructed in any desired fashion so long as they cooperate during rotation of the shaft, or shafts, and during rest periods thereof to prevent liquid from reaching the bearings.

It will be understood that various modifications and changes may be made in the preferred form of the invention herein, and such modifications and changes are to be understood as part of this invention, as outlined in the following claim.

The invention claimed is:

In a washing machine of the class wherein there is a liquid container, a perforated tumbling drum in the container, a fixed wall of the container spaced from the drum, a rotary drive shaft extending horizontally through the wall and across said space to the drum, and a bearing for the shaft where the shaft passes through the wall, the combination with said shaft of a first and outer shell surrounding the shaft and having a truncated conical portion extending axially across part of the space between the drum and the fixed wall, said first shell having the larger diameter end of the conical portion opening toward the fixed wall, and the periphery of said first shell being located directly above the liquid in the container and in position to be splashed by liquid when the liquid in the container is disturbed by the tumbling drum, said first shell being connected with the shaft so as to rotate therewith, a second shell connected to the fixed wall and having a truncated conical portion surrounding the shaft and facing in the opposite direction from the first shell and extending into the first shell, said second shell being open at the larger diameter end and with the peripheral edge of said larger diameter end close to but with clearance from the inner surface of the first shell at a mid portion along the axial length of the inner surface of said first shell, a part of the length of the truncated conical portion of the second shell extending beyond the larger diameter portion of the first shell at a location directly over the liquid in the container and in position to be splashed by the liquid when the liquid is disturbed by the drum, and a third shell within the second shell and connected with the shaft for rotation as a unit with the shaft and the first shell, said third shell having a truncated conical portion with its larger end opening toward the smaller end of the second shell, and with the periphery of its larger end close to a mid portion of the inner surface of the second shell.

References Cited in the file of this patent

UNITED STATES PATENTS

| | | |
|---|---|---|
| 228,761 | Hurtle | June 15, 1880 |
| 1,145,516 | Schmid-Roost | July 6, 1915 |
| 1,917,674 | Weaver | Mar. 12, 1931 |
| 1,888,475 | Schmitz | Nov. 22, 1932 |
| 2,377,192 | Thaxton | May 29, 1945 |
| 2,549,274 | Winborn | Apr. 17, 1951 |

FOREIGN PATENTS

| | | |
|---|---|---|
| 835,666 | Germany | Apr. 3, 1952 |